(12) United States Patent
Stockwald

(10) Patent No.: US 7,157,867 B2
(45) Date of Patent: Jan. 2, 2007

(54) OPERATING METHOD, ELECTRONIC BALLAST AND SYSTEM FOR RESONANT OPERATION OF HIGH PRESSURE LAMPS IN THE LONGITUDINAL MODE

(75) Inventor: Klaus Stockwald, Munich (DE)

(73) Assignee: Patent-Treuhand-Gesellschaft für Elektrische Glühlampen mbH, Munich (DE)

( * ) Notice: Subject to any disclaimer, the term of this patent is extended or adjusted under 35 U.S.C. 154(b) by 0 days.

(21) Appl. No.: 11/041,313

(22) Filed: Jan. 25, 2005

(65) Prior Publication Data

US 2005/0168176 A1  Aug. 4, 2005

(30) Foreign Application Priority Data

Jan. 30, 2004  (DE) .................. 10 2004 004 829

(51) Int. Cl.
*H05B 37/02*  (2006.01)
*H03C 1/00*  (2006.01)
*H03K 7/04*  (2006.01)

(52) U.S. Cl. .................. 315/360; 332/112; 332/183
(58) Field of Classification Search ............... 315/246, 315/291, 307, 308, 360; 332/108, 112, 118, 332/120, 121, 122, 150, 153, 183
See application file for complete search history.

(56) References Cited

U.S. PATENT DOCUMENTS

| | | | |
|---|---|---|---|
| 6,184,633 B1* | 2/2001 | Kramer | 315/246 |
| 6,400,100 B1* | 6/2002 | Kramer | 315/291 |
| 6,437,517 B1* | 8/2002 | Kramer | 315/246 |
| 6,653,799 B1* | 11/2003 | Cammack | 315/224 |
| 6,922,114 B1* | 7/2005 | Kastle et al. | 332/153 |

* cited by examiner

*Primary Examiner*—Thuy Vinh Tran
(74) *Attorney, Agent, or Firm*—Carlo S. Bessone

(57) ABSTRACT

The operating method is based on the simultaneous use of FM and AM and is distinguished by passing through a number of steps which are used to find an optimum frequency for the AM and, in addition, to define an optimum AM level. An electronic ballast which has a memory module which can be overwritten is used for implementation.

11 Claims, 11 Drawing Sheets

Step 4: Approach FMopt

US 7,157,867 B2

OPERATING METHOD, ELECTRONIC BALLAST AND SYSTEM FOR RESONANT OPERATION OF HIGH PRESSURE LAMPS IN THE LONGITUDINAL MODE

TECHNICAL FIELD

This application is closely related to DE-application no. 10 2004 004 828.2, which was submitted in parallel and which is hereby expressly referred to.

The invention relates to an operating method, an electronic ballast and a system for resonant operation of high-pressure lamps in the longitudinal mode, with an operating method for acoustic resonant operation of metal halide lamps using a radio frequency carrier frequency which is frequency-modulated (FM) by means of a sweep signal and which is amplitude-modulated (AM) at the same time, with a fundamental frequency first of all being set for the AM signal, which is derived from the $i^{th}$, preferably the second, longitudinal mode. This relates, in particular, to high-pressure discharge lamps with a ceramic discharge vessel, preferably with an aspect ratio of at least 1.5.

BACKGROUND ART

U.S. Pat. No. 6,400,100 has already disclosed an operating method, an electronic ballast and a system for resonant operation of high-pressure lamps in the longitudinal mode. This document specifies a method for finding the second longitudinal acoustic resonant frequency. This is based on the assumption that when the frequency range which contains the longitudinal mode is scanned continuously, the resonant frequency in the vertical operating position can be found by the occurrence of a relative operating voltage increase for the lamp. It is self-evident that this method results in the longitudinal frequency being found, and then maintained, for a segregated, that is to say demixed, state of the plasma located in the discharge vessel at vertical resonance. This frequency found in this way can, however, be located considerably too high depending on the filling composition of the metal halide filling and the time by which the search procedure is carried out, so that stimulation of the acoustic resonance at the frequency found using the above-mentioned method results in inadequate thorough mixing, and does not sufficiently well cancel out the segregation, that is to say the demixing of the plasma. Furthermore, the implementation of the operating method in suitable components of an electronic ballast is complex.

DISCLOSURE OF THE INVENTION

One object of the present invention is to provide an operating method for a metal halide lamp, which ensures optimum thorough mixing in a different operating position of the lamp. The operating method for acoustic resonant operation of metal halide lamps is using a radio frequency carrier frequency which is frequency-modulated (FM) by means of a sweep signal and which is amplitude-modulated (AM) at the same time, with a fundamental frequency first of all being set for the AM signal, which is derived from the $i^{th}$, preferably the second, longitudinal mode. This relates, in particular, to high-pressure discharge lamps with a ceramic discharge vessel, preferably with an aspect ratio of at least 1.5.

The invention is based on the further object of operating a metal halide lamp with good color rendition and an increased light yield such that its operating position is not subject to any restrictions. There may possibly be a minor difference in the operating data between the horizontal and vertical operating positions. A further object is to provide an electronic ballast which carries out a procedure that is as far as possible automated in order to achieve approximately the same color rendition and light yield by application of suitable amplitude modulation with an AM level AMI in the vicinity of a longitudinal acoustic resonance for different operating positions.

A further object is to reliably find a desired acoustic resonance, preferably the second longitudinal resonance, in each operating position. A further object is to specify an associated system for this purpose. A further object is to determine and to set an optimum resonant frequency setting for mixing of the metal halide plasma during operation of high-efficiency high-pressure lamps. A further object is to specify an algorithm by means of which, during lamp operation, a ballast determines the optimum frequency setting of the mixing acoustic resonance for mixing of the metal halide plasma, and sets this reproduceably.

The object of the operating method is achieved by the following features:

at least the following steps are carried out successively after starting of the lamp and after waiting for a stabilization time:

a) Preparation step: during this step, a first resonance of the impedance value Z, that is to say ZEXT 1, is first of all determined theoretically or experimentally during this step with a very low AM level AMI of 5 to 15% in such a way that a large frequency interval is covered for f(AM) which will certainly include the extreme; the frequency point FM1 associated with ZEXT 1 is used to define a measurement interval MI which has a width of 8 to 25 kHz with the cut-off points ST (upper cut-off frequency) and SM (lower cut-off frequency), and in which FM1 is arranged such that FM1 is located at approximately 55 to 80%, preferably 60 to 70%, of the interval between SM and ST, where FM1 must always be closer to ST;

b) Step 1: the measurement interval MI is passed through during this step; a family of characteristics is thus determined which is obtained by passing through different AM levels, which are changed in steps, in a maximum range AMI=5 to 45%, in particular 10 to 40%, with the measurement interval MI in each case always being passed through from top to bottom, that is to say from ST to SP;

c) Step 2: determination derived from the family of characteristics, of the optimum AM level AMI=AMopt by comparison of the change in the lamp impedance as a function of the frequency for the various AM levels; determination of the maximum of the change in the lamp impedance for an associated value of AMI=AMmd; Definition of AMopt by the rule AMopt=AMmd+W where W=3 to 10%;

d) Step 3: Search for the frequency FMmin associated with AMopt;

e) Step 4: Definition of the operating frequency FMopt by passing through the frequency interval OPT between FMmin and a value which is 20% of FM2 away in the interval between FMmin and FM2.

Particularly advantageous refinements are contained in the dependent claims. An electronic ballast which uses this method is also specified.

Certain manufacturing tolerances and the changes in the internal length which unavoidably occur over lengthy operating periods of ceramic metal halide lamps, as well as minor changes in the speeds of sound in the lamp plasma, for example owing to fluctuation in the ambient temperature and changes in the filling composition, repeatedly cause changes in the resonant frequency in the discharge lamp in the long term, but also in the short term. This necessitates continuous readjustment of the tuning criterion in order to set the desired frequency or the desired frequency range exactly, which has a positive effect on thorough mixing with the aid of the longitudinal acoustic resonance.

The operating method according to the invention is aimed from the start at always stimulating a specific frequency, preferably in the vicinity of the second longitudinal resonance of the horizontal operating position, during continuous operation, because this allows optimum thorough mixing of the filling components, particularly of the metal halides, to be achieved even when the lamp is operated in a position other than the horizontal. Color effects and color scatter are thus largely avoided. This frequency must be applied to the system with a delay after complying with a certain stabilization time. This procedure allows reliable stabilization in the vicinity of the optimum resonance, in particular the second longitudinal acoustic resonance f002 for the horizontal operating position. The method is particularly suitable for ceramic high-pressure lamps with an aspect ratio (length: diameter) of at least 1.5, and preferably $\geq 2$ (typically 3 to 6). It uses an RF sweep mode, thus suppressing the segregation and improving the thorough mixing of the metal halide arc plasma.

It is self-evident that the best thorough mixing occurs when the lamp is initially stimulated in approximately the same resonance conditions during its warming-up phase, even when it is not in a horizontal position, and in particular even when it is in a vertical position, as in the case of the identical resonance in the horizontal operating position. Different convection conditions result in there being virtually no segregation when the lamp is horizontal.

According to the invention, an improved method which is more reliable than WO 02/09480 or U.S. Pat. No. 6,400,100 is proposed, which is implemented more easily and at a lower cost in electronic ballasts.

The position of the resonance f002 in the horizontal operating position is determined first of all for an individual lamp. This can be done once in advance by various methods, or repeatedly on-line during operation of the lamp, for example by measurement of the lamp impedance during operation with a square-wave current applied and a superimposed sinusoidal signal, in which case, by way of example, the amplitude of the sinusoidal component should be about 5–15% of the current amplitude during variation of the frequency of the sinusoidal signal.

For reliable operation of the method, it is desirable for there to be a narrow tolerance range for the internal length IL of typically $\leq 1\% \times IL$ for a predetermined geometry of the discharge vessel. The internal length represents that dimension of the lamp which defines the second longitudinal acoustic resonance which must be stimulated for optimum thorough mixing of the arc plasma, particularly in a vertical operating position. The geometry is preferably cylindrical with straight or inclined ends, although bulged vessels are also suitable. In cases such as this, an effective internal length can be assumed instead of a geometrically determined internal length.

In the vertical operating position, the demixing of the filling components that is strongly associated with this position results in major changes to the speeds of sound, which lead to the frequency of the acoustic second longitudinal resonance (f002_vert) being considerably shifted with respect to the frequency in the horizontal operating position, referred to for short as f002_hor after starting of the lamp, to be precise generally towards higher frequencies. When operated according to the invention, which results in gradual thorough mixing, this resonant frequency then changes over the course of time until it once again corresponds approximately to that for horizontal operation, that is to say f002_hor.

In this case, the segregation which occurs in particular during vertical operation results in discrepancies in the effective speed of sound of up to 30% generally of about 10 to 25%, towards higher values, compared to the thoroughly mixed state in the horizontal operating position. For example, discrepancies in the effective speeds of sound of about 15–20% in comparison to thoroughly mixed operation are found in the case of mercury/argon buffer gas mixtures. One specific measured value was, by way of example, 550 m/s compared to 464 m/s.

The acoustic resonant frequency of the i-th longitudinal acoustic resonance in a discharge vessel of internal length IL is generally given by the product:

$$f00i = i*cl/(2*IL);$$

thus, for i=2 (second acoustic resonance): $f002 = cl/IL$.

In this case, cl is the effective (longitudinally effective) speed of sound cl, where:

$$cl = (R*k*T/M)^{1/2}$$

where R: general gas constant, k: compressability; T: mean plasma temperature; M: mean molar mass of the plasma gas; IL=effective axial length of the discharge vessel).

The relationship between the tube radius R and an effective (azimuth effective) speed of sound $C_{az}$ for azimuth acoustic resonances is:

$fi00 = a_{i0} \ c_{az}/(2*\Pi*R)$, where $a_{i0}$ for i=1, 2, . . . =Bessel coefficient: $a_{10}=1.84$; $a_{20}=3.05$; $a_{30}=4.2$ etc.

The relationship between the tube radius R and an effective radially effective speed of sound cr for the radial acoustic resonances is:

$f0i0 = a_{0i} \ c_r/(2*\Pi*R)$; where $a_{0i}$ for i=1, 2, . . . =Bessel coefficient: $a_{01}=3.83$; $a_2=7.016$; etc.

The electrical power oscillations which occur govern the stimulation of these sound resonances in the closed, approximately cylindrical lamp bulb. This means that the power frequency fP when stimulated with sinusoidal current waveforms at the frequency fl is: fP=2*fl.

In principle, the invention is based on an electrical carrier frequency v in the RF range which is typical for lamp applications, for example v=50 kHz, to which a sweep frequency fFM is applied as frequency modulation, whose value is chosen from a range which extends from the first azimuth resonance to the first radial resonance. It is particularly preferable for fFM to have a value which is in the vicinity of the mean value, in particular being directly at the mean value, between the two resonances. One reference point is a sweep which differs from the carrier frequency by up to 10%. The sweep rate is typically in the range from 100 to 1000 per second.

The sweep operation is preferably carried out in the form of a ramp at a rising or falling frequency.

This operating mode uses the effect of arc stabilization on the central axis of the discharge vessel in both the vertical and horizontal operating positions by stimulation of centring gas oscillations about the arc core.

If necessary after waiting for a stabilization time (warming-up of the lamp) to pass, this basic current signal waveform also has amplitude modulation AM applied to it, whose fundamental frequency is the second longitudinal resonance f002hor in the horizontal operating position. This fundamental frequency is used as the control basis.

It is self-evident that, when being operated vertically, the resonant frequencies with the discharge vessel internal dimensions used in this case—a typical value is 12 to 24 mm—are shifted by up to 5 kHz in comparison to the horizontal or thoroughly mixed condition. The procedure described here reliably leads to the desired way of operation.

There are a number of embodiments which are suitable for use as solution approaches to reliably achieve the best-possible thorough mixing of the arc plasma and to largely correct the segregation. A number of operating methods for setting amplitude modulation for which thorough mixing takes place at the best effective second horizontal longitudinal resonance f002 in any desired operating position, preferably for frequency modulation in the sweep mode at or in the vicinity of a value of about 0.9 to 1.1× (f100+f010)/2, are described in the following text here. This sweep range of 10% fSW corresponds approximately to a window of 5 kHz in both directions. The frequency fSW can be chosen in the vicinity of the first azimuth and radial resonance f100 and f010, preferably in the vicinity of their mean value with a discrepancy of up to 10%, that is to say 10%× (f100+f010)/2).

One precondition for a method for setting the AM frequency for optimum thorough mixing of the arc plasma in any operating position is, first of all the determination and storage of the position of the second longitudinal resonant frequency f002 in the horizontal operating position, in which thorough mixing in practice always takes place. In order to set basic operation at this frequency, the geometry of the discharge vessel in that particular case and the composition of the buffer gas must first of all be individually characterized and investigated for acoustic resonances for each lamp, so that the first azimuth resonant frequency f100 and the first radial resonant frequency f010 are known in addition to the second longitudinal resonant frequency f002. Furthermore, the mean value of the two frequencies (f100+f010)/2 is calculated from this, and is stored.

In a first embodiment, a procedure for stabilization in the best thoroughly mixed operating state can be carried out by setting the fundamental frequency fAM of the amplitude modulation AM to a value of 1.15 to 1.25 times the frequency f002_hor after the striking of the arc discharge and after allowing a warming-up phase (stabilization time to the time t1) of about 30 to 80 seconds, preferably about 60 seconds, to pass, within an application phase of about 60 to 150 seconds. Prior to this, the AM frequency can be selected as required, with f002_hor preferably being used as the default. The AM level can also be set in advance as required in a range from 0 to 25%. The AM level is set to 15 to 30% at the time at which the fundamental frequency fAM is increased in the application phase, with a frequency which is 18–20% higher than f002_hor preferably being set in this case.

The fundamental solution comprises the controlled identification of the optimum frequency point fopt for the AM and the matching signal level AMI for the AM level for thorough mixing of the metal halide plasma in a metal halide discharge lamp that is controlled by means of acoustic longitudinal resonances, and the provision of an electronic ballast for operation in the optimally mixed mode.

It is self-evident that a characteristic behavior for the lamp impedance Z, in which a local peak Z occurs, is formed—starting from higher frequencies, for example 1.25×f002hor, and towards lower frequencies—during successive coverage of the frequency range ΔF of the AM frequency fAM, in which thorough mixing of the segregated, less thoroughly mixed metal halide plasma can be achieved.

The AM level is a measure of the respective electrical power related to the total power which is converted to stimulation of longitudinal resonances. If the AM level is increased in steps, for example in steps of about 2.5%, then, for a given AM level, this results in a characteristic behavior of the lamp impedance in each case through the frequency range ΔF.

The behavior of the lamp impedance Z(fAM) as a function of the frequency fAM over the frequency range ΔF is recorded as a function of the AM level, and is stored as a family of characteristics. In this case, as the AM level is increased, one and then two, or in some circumstances even several dynamic extremes of the lamp impedance, which follow one another as a function of fAM, is or are evident, which are formed and shifted in a characteristic manner in the profile of the step-by-step increase in the AM level.

The power signal level of a signal frequency which controls the discharge that includes thorough mixing of the metal halides may, in particular, also be used as an operating parameter instead of the amplitude modulation level, for example the signal level of a linear superimposition which results in a mixed longitudinal-asimuth resonance, which results in similarly increased thorough mixing of the arc plasma to that at the second longitudinal resonance.

The method is subdivided into a number of steps, and comprises at least two steps.

The first step is successive scanning of a relatively wide frequency interval of the amplitude modulation (fAM). The scanning range is between an upper start point ST and a lower end point SP, so that the frequency of the frequency start point ST is higher than the end point SP.

First of all, however, the frequency range within which any mixing at all of the metal halides occurs which can be identified from a maximum in the lamp impedance, is determined roughly in a preparation step. Its end points are referred to as FM1 (upper end point of the mixing frequency range) and FM2 (lower end point of the mixing frequency range), where the frequency start point was ST and the frequency end point was SP each being outside the mixing frequency range. The condition ST>FM1>FM2>SP must therefore be satisfied for these frequencies.

The finding of the mixing frequency range as a preparatory stage for the first step can be determined, for example, in advance as it occurs by means of course scanning with a low AM signal level (AMI=5–10%).

In another embodiment this frequency interval [ST, SP] is in principle determined just once for a geometry with a given internal diameter ID and a given internal length IL as well as a given metal halide filling, and is stored in the associated electronic ballast.

The interval width for the first step is then defined. Typically, both ST and SP should each preferably be at least 10–15% outside the window covered by FM1 and FM2 (ST≧1.10*FM1; SP≦0.9*FM2). The desired value can be preprogrammed in the lamp system comprising the lamp and the electronic ballast, or can be stated as an input command.

A typical interval width for the scanning range ST–SP for the first step is approximately 8–15 kHz.

In one specific exemplary embodiment, the discharge vessel of the lamp has an internal length of 19 mm and an internal diameter of 4 mm, and the buffer gas is a mixture of mercury and argon. In this case, the optimum mixing resonant frequency fAM is between 22 and 25 kHz. The FM1 is thus 25 kHz, and FM2 is 22 kHz. In this case, it is possible to scan downward over the interval from ST=30 kHz to SP=20 kHz.

The direction of the frequency scan from the higher ST to the lower end frequency SP is a result of the discovery that the acoustic resonances, in particular for vertical operation, are shifted systematically towards higher frequencies in the segregated state with amplitude modulation being used continuously. This behavior contrasts with the teaching in U.S. Pat. No. 6,400,100. Furthermore, it has been found that a sufficiently slow shift over a constant time, in particular with a shift rate of typically 0.05–1 kHz/s, results in the stimulation frequency fAM of the thoroughly mixed acoustic frequency signal, for an adequate signal magnitude and with an AM level of typically 10–40% always results in better thorough mixing of the lamp plasma, with the resonant frequency f002 thus being shifted towards lower frequencies, in the direction f002hor.

One parameter which is ideally suited to monitoring of this situation is the mean lamp impedance $Z=Urms/Irms$, as occurs when the shift in fAM occurs over a constant time (rms=root mean square).

There is need to completely characterize Z as a function of time for the optimum setting. As a minimum requirement, it is sufficient to take a measurement in the desired operating position, in particular vertically, in which case a single complete scan of the frequency range FM is sufficient, to be precise between the limits FM1 and FM2 in which thorough mixing occurs. For safety, a wider frequency window is preferably chosen between the frequency start point ST and the frequency end point SP, because there is no significant thorough plasma mixing at the end point SP, and there may be little thorough plasma mixing at the upper frequency point ST.

The described procedure makes use of the thorough mixing of the metal halides in the plasma, which is gradually improved as the frequency shifting progresses, in order to determine characteristic frequencies, that is to say in particular the resonant frequency F002, for the mixing process. It is self-evident that a constant frequency shift rate (frequency scan) should-preferably be chosen, with an optimum rate for this purpose being in the order of magnitude of 0.1 to 0.5 kHz/s, which is appropriate for normal lamp operation. Furthermore, it is recommended that the procedure should not be carried out until after a warming-up operating phase of about 1–3 minutes.

Depending on the power of the discharge lamp, the changed temperature profile of the gas discharge may change both axially and radially as the thorough mixing of the gas improves, thus also changing the location of the isotherms in the discharge vessel. Depending on the thermal capacity of the discharge vessel, the process of matching to the new conditions in the plasma must be carried out sufficiently slowly until the thermal equilibrium is reached. This requires time intervals of different length depending on the shape and volume of the discharge vessel.

If the lower frequency FM2 for acoustically stimulating thorough mixing of the arc plasma is undershot, an abrupt change in the lamp impedance occurs and the metal halide mixing of the arc plasma changes back to the less influenced state, or to the entirely uninfluenced state.

The following embodiments are particularly preferred.

For all application-relevant metal halide mixtures, for example with alkali halides and/or rare-earth halides, in particular iodines such as the following components:

NaI, LiI or CsI and rare-earth (RE) components (CeI3, DyI3, NaI3, PrI3, HoI3, TmI3, DyI3 possibly as well as further components of $ZnI_2$, $InI$, $TlI$, $MgI_2$, $CaI_2$, Hg and Zn, in particular for molar components of alkali halide content $\leq 90$ mol-% essentially results in the following behavior being observed, and the following procedure, which is carried out in steps, is proposed for selection of the optimum operating parameters and is implemented by automatic adjustment in an appropriately equipped electronic ballast.

Step 1:

The AM level AMI is used as the signal level. The AM level AMI, also referred to as the AM Index, is defined by:

$$AMI = (U\max - U\min)/(U\max + U\min).$$

Umax and Umin are the maximum and minimum operating voltage. In order to determine the optimum acoustic plasma mixing, the value of AMI is increased in steps until the lamp impedance has at least two pronounced characteristic maxima ZMAX1 and ZMAX2, between which there is an impedance minimum ZMIN, instead of a single maximum while scanning through the mixing frequency range FM.

In some circumstances, situations may occur which, conversely, lead to a reduced lamp impedance when the thorough plasma mixing level is increased: it is thus more generally true that there is an inverse extreme ZINV between two extreme values ZEXTR1 and ZEXTR2.

The magnitude of the lamp impedance, best of all in comparison to the apparently not thoroughly mixed state Zrel, is thus advantageously used for the evaluation process, that is to say $Z(fAM) \sim |Z(fAM)/Zrel|$.

The absolute lamp impedance change is advantageously related to the only insignificantly mixed state at the frequency end points ST and SP, that is to say either to Z(fAM=ST) or to Z(fAM=SP). Since both values have approximately the same magnitude, it is also possible, in a preferred manner, to use their mean value, instead of this, as the reference impedance $ZREF = (Z(fAM=ST) + Z(fAM=ST))/2$.

In order to simplify the evaluation process, this normalized impedance can be multiplied by an undefined factor k, so that:

$$Zn(fAM) = k*|Z(fAM)/Zrel|$$

In the following text, this is understood as being a characteristic variable for the impedance and is thus referred to, for simplicity, without being changed as the impedance.

In the course of the frequency changing for the amplitude modulation ST to SP, the lamp impedance Z(fAM) changes in a manner which characterizes the respective metal halide mixing process, indicating that the plasma is becoming increasingly thoroughly mixed. When the alkali content is relatively low, maxima occur, while characteristic impedance reductions occur as the plasma becomes increasingly thoroughly mixed for other metal halide mixtures with a considerably increased alkali content, so that maxima of the characteristic variable Zn(fAM) are formed in each case.

In order to determine the maxima of Zn(fAM), the modulation level AMI is increased in steps, and the mixing frequency interval [ST, SP] scanned repeatedly with the AMI in each case being kept constant, until the characteristic impedance changes are evident in the function Z(fAM). During this process, the modulation level AMI can be increased in steps of about 2–5% in each case, typically starting from a value of about 5–10%, so that about 4–12 runs are required on average. An adequate maximum value for the AM level is normally between 20 and 40%.

It has been found that no more plasma mixing takes place below the frequency of the second impedance maximum ZMAX2 at low frequencies in the course of the frequency shift from the upper start point ST to the lower end point SP. This means that FM2 is defined by the frequency at which ZMAX2 occurs.

The change in Z(fAM) after passing through the maximum ZMAX2 (which is adjacent to the lower scan frequency SP) at the frequency FM2 is considerably higher than in the rest of the scanning range. This is because the temperature profile of the arc discharge changes in a characteristic manner. This behavior is evident in a corresponding manner with all metal halide discharge plasmas, in which case a major change in the lamp impedance of typically 5–20% may be found at the transition to the unmixed plasma state in the vicinity of SP. This abrupt change occurs at least within a time period of a few tenths of a second.

This means that the characteristic variable for the change in the impedance $^-Z$ with the frequency fAM reaches an extreme, that is to say with the value dZ(fAM)/dfAM reaching a negative minimum. The impedance characteristic can advantageously be evaluated on the basis of this criterion, furthermore, in order to determine the definition of the lower AM frequency FM2 for plasma mixing.

It has also been found that the AM level AMI which is required for long-term stable operation can be determined from the overall behavior of the shift in FM2 as a function of the AM level AMI.

Step 2 is carried out for this purpose:

The shift rate of the function FM2(AMI) in the AM level range from about 5–35% is determined, typically in steps of about AMI=2.5% (for example 10 runs). During this process, an increased shift in the frequency FM2 with the AM level occurs at the transition from the formation of a single impedance extreme to a greater number of identical (typically two) impedance extremes. After passing through the region of increased shift, the function FM2(AMI) once again changes at a considerably lower rate as the AMI has increased further. An AM level, AMIopt is chosen which is associated with the region of increased thorough mixing when more than one impedance extreme occurs. This is typically an AM level AMIopt which is about 3 to 10% higher, in particular 5% higher, than that AM level at which the second impedance extreme is just formed.

3rd step: Setting of the stimulation frequency for increased plasma mixing:

Using the AM index AMIopt defined in step 2, the AM frequency fAM is now varied at a comparable rate to that in step 1 (typically 0.1–0.5 kHz/s) starting from ST or at least from FM1 in the direction of FM2 as far as a frequency point fAMopt which occurs at the frequency point of the minimum (more generally: the inverse extreme) of the impedance change FM2<FMmin<FM1.

It is self-evident that the thorough mixing of the arc plasma is improved in the range between FMmin and FM2. The greatest restriction in the arc profile is observed as the symmetrical formation of two constricted arc areas at FM2. The greatest change in the plasma impedance is observed after passing below the frequency point FM2 as the frequency is reduced further, as a result of the abrupt breakdown in the externally applied thorough mixing, that is to say the forced thorough mixing. This effect occurs both in the vertical and horizontal operating positions.

Surprisingly, exact setting at FM2 has been found not to be expedient for stable thorough plasma mixing, since effects such a long-term drift and minor changes in the plasma composition resulting from absorbtion or the like, as well as changes in the distribution of the filling components, can very easily lead to disturbance of the effective thorough mixing of the plasma, which is stable in the long term.

This problem is overcome by setting to a somewhat higher frequency. The best approach, both for deliberate setting of the color temperature and for a high light yield as well as for good color stability has been found to be the frequency range between the lower cut-off frequency FM2, which is associated with the lower impedance maximum ZMAX2, and the somewhat higher frequency FMmin, which is associated with the impedance minimum ZMIN which occurs between ZMAX2 and ZMAX1.

The interval between the lower cut-off frequency FM2 and FMmin depends on the AM level and, in consequence, it can be set to a certain extent on the basis of the AM level. The higher the chosen AM level, the more pronounced is the impedance minimum ZMIN and the greater is the interval between FM2 and ZMIN. This consideration can be used in particular to define the ultimately chosen AM level AMopt.

Practical investigations have found that an interval of at least 400 Hz, in particular up to 900 Hz, between the frequency FM2 and FMmin should be set by means of the AM level, thus achieving long-term stability throughout the entire life.

The production of the family of characteristics with the characteristic signal levels AMI as well as the characteristic frequencies, and the determination of the cut-off frequencies (ST, SP, FM1, 2) for acoustic plasma mixing, in particular by the second longitudinal resonance, are typically carried out only after stabilization of the lamp, that is to say 1 to 3 min. after lamp starting, with a frequency shift rate of about 100 Hz/s to 1 kHz/s (AM or RF) and a step width (resolution) of 100 to 200 Hz. This measurement may be carried out once after the lamp has been started for the first time, or else repeatedly at regular time intervals, or whenever the lamp is started.

Furthermore, for stable long-term adjustment, it has been found to be advantageous to take into account the following discoveries.

Surprisingly, it has been found that, despite the change in the lamp impedance after a relatively long operating period, the instantaneous local minimum of the lamp impedance ZMIN(a) is still in the vicinity of the impedance minimum ZMIN(i) found when the lamp was started for the first time, so that ZMIN(i) can always be used as a reference point for optimum acoustic thorough plasma mixing.

After the first scan, it has been found that the impedance minimum can still be followed, despite a certain amount of drift, by means of considerably slower frequency change rates of 50–100 Hz/min in steps of about 50 to 100 Hz.

In one particularly preferred embodiment of the method, this procedure allows the color stability of the lamp to be improved considerably. An extended operating method, which is based on the first method in steps 1–3, for setting the color of high-pressure discharge lamps which are operated by means of amplitude modulation and RF sweep, is thus also proposed:

The starting point for this method is the lower impedance maximum ZMAX2 at the frequency FM2, or else a frequency which is within the thorough mixing range and is higher than FM2 by at least 150 Hz, preferably at least 200 Hz. This frequency is then increased in steps of 50 to 150 Hz, with the lamp impedance being measured in the process. After a stabilization time period of at least 1 min, the lamp impedance is once again measured at the frequency points which have already been scanned through, and is recorded, for example in a non-volatile memory in which the data is stored by means of micro-processor control.

After passing over an ensuing lamp impedance minimum, the last frequency immediately before the occurrence of the minimum is set, that is to say the frequency which, in the step sequence, immediately precedes the frequency associated with the impedance minimum.

A setting method such as this is fairly reliable, although this standard method can take a relatively long time, however, owing to the long setting times for each frequency point (approximately 1 to 5 min).

Thus, as an alternative, frequency scans which take less time have also been carried out and have been compared with the careful standard method, which is slow to carry out. The aim in this case is to always ensure adequate filling deposition despite the shortness of the measurement time, corresponding virtually to the conditions in the continuous operating state, represented by the standard method.

It is self-evident that even frequency scans which are carried out considerably more quickly, based on frequency shift rates of 100 to 300 Hz/s, and which actually no longer allow adequate filling deposition, can be used to determine the optimum frequency point. The following method is particularly preferred:

For this purpose, a frequency range fAM is scanned a number of times, in particular at least twice, using a frequency shift rate of 100 to 300 Hz/s, starting from a high frequency ST, which is at the upper end of the thorough plasma mixing range, to a low frequency SP, which is below the lowest frequency for plasma mixing FM2. The frequency interval to be covered has a typical width of 5–10 kHz. The amplitude modulation frequency is shifted during this process, and the lamp impedance Z(fAM) is measured at each frequency measurement point fAM, to be precise remaining at each frequency measurement point for a typical time of 0.2 to 1 s. The measured values are stored in a non-volatile memory.

The impedance profile between the impedance maximum ZMAX at the frequency FM2, below which thorough plasma mixing no longer occurs, and the previous impedance minimum ZMIN at a somewhat higher frequency FMmin is used in order to choose the frequency point for optimum operation.

Once the range has been reached by means of step 3, step 4 is thus carried out.

During this process, a preferred optimum frequency point fopt is selected from the range between the point FMmin and the point (FM2+1/5×(FM2–FMmin).

The frequency point fopt which is found in this way essentially has the same characteristics as that frequency point FMmin which results in a local minimum in the relative impedance change during the slow scan of the lamp impedance, and this is thus recorded as the optimal frequency point for long-term equilibrium of the thorough mixing process.

If the lamp power is controlled by means of the ballast (for example for dimming purposes), the entire measurement process must be repeated once again after setting a different lamp power, in order to determine the optimum frequency point for the newly set lamp parameters.

This power matching may be carried out by means of known characteristics relating to the lamp properties, which have already been determined by the manufacturer and may have already been stored in the electronic ballast, based on the above principle, but with shorter step sequences, thus resulting in considerably less time being consumed than for the first measurement.

The entire method may, of course, be carried out by a programmed electronic ballast, which is controlled by a microprocessor, and also allows the relevant operating parameters to be adapted for different lamp types (for example a different color temperature) at one lamp power level. A similar situation applies to identical lamp types with lamp power levels which do not differ too much from one another. This results in a single electronic ballast for RF operation of a number of lamp types, with operation stabilization using longitudinal acoustic resonance modes, preferably the second acoustic resonance. Finally, this technology also makes it possible to set different color temperatures for one lamp, for example by stimulating different acoustic resonance modes.

The invention also covers combinations of the methods described above and the implementation of the method in a ballast. The time periods prior to the start of the described procedures, that is to say the effective changes in the frequencies and AM levels, are determined by the power input from the ballast during the starting-up phase. These stated time periods can be shortened by briefly increasing the power input by up to 50% immediately after the start of the arc discharge. Conversely, the time period stated above can be increased by up to 200% when using discharge vessels with a particularly high thermal capacity.

Furthermore, the measurement steps for determination of the frequency fAM and of the AM level may be carried out two or more times.

Characteristics for specific combinations of the lamp geometry and the filling system can advantageously be preprogrammed in the electronic ballast by the manufacturer of the system, of the ballast and of suitable lamps, thus making it possible to use a shorter method, using only individual step elements. However, it is recommended that the setting of fopt for a given AM level AMI be checked repeatedly and if necessary be adapted so that at least step 3 is carried out whenever the lamp is started.

In addition, a starting and switching-off criterion for the high-pressure lamp to be operated can be set in a defined manner by means of automatic measurements of the operating voltage and of the impedance of the lamp.

In addition to the method, the invention also covers electronic ballasts with microprocessors in which the described procedures are implemented.

BRIEF DESCRIPTION OF THE DRAWINGS

The invention will be explained in more detail in the following text with reference to a number of exemplary embodiments. In the figures.

BEST MODE FOR CARRYING OUT THE INVENTION

Figure 1:
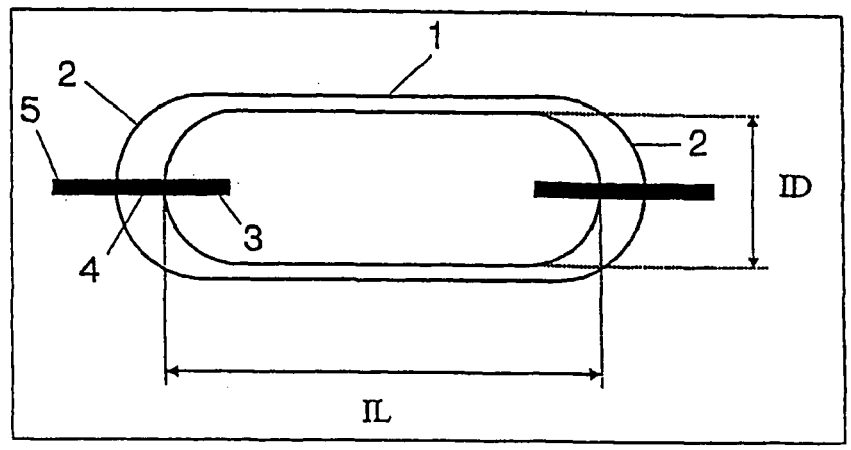
FIG. 1 shows, schematically, a discharge vessel of a high-pressure lamp.

FIG. 1 shows a schematic illustration of a high-pressure discharge lamp with a relatively high aspect ratio ID/IL. This uses a cylindrical discharge vessel 1 made of ceramic, with a given internal diameter ID and a given internal length IL. Electrodes 3 are arranged at the ends 2 of the discharge vessel and are connected by means of lead-throughs 4 to external power supply leads 5. Typically, the discharge vessel is filled with a buffer gas comprising mercury with argon and metal halides, for example a mixture of alkali and rare-earth iodides as well as thallium iodide. The lamp is operated on an electronic ballast, see FIG. 8, at radio frequency at an acoustically stabilized resonance. The second longitudinal resonance has been found to be particularly worthwhile for this purpose.

The lamp investigated in more detail is a high-efficiency metal halide lamp with a power of 70 W. The discharge vessel has a maximum axial internal length IL of. 18.7 mm, and an internal diameter ID of 4 mm. The aspect ratio is thus 4.7. The high-pressure lamp is filled with 4.4 mg of mercury and a metal halide mixture comprising NaI:CeI3:CaI2:TlI=1.78:0.28:1.93:0.28 mg. The electrode spacing is 14.8 mm.

Initial investigations have shown that arc-stabilized operation is possible, in which the arc is centered with respect to the electrode connecting line in the vertical and horizontal operating positions. This is based on the assumption of operation with a swept radio frequency in the range from 45–55 kHz, with a typical sweep rate of fFM=130 Hz.

After the start of operation and a warming-up phase of about 120 seconds, a segregated, that is to say demixed, metal halide distribution along the arc is evident in the vertical operating position. The proportion of metal halides in the vapor phase is not distributed uniformly over the arc length. The emission of alkali and rare-earth iodides is concentrated in the lower third of the lamp, while mercury and Tl emission is mainly observed in the upper part, up to the upper electrode. In this state, the lamp has relatively poor color rendition and a relatively low light yield in this state. Furthermore, the color temperature in the vertical operating position differs significantly from that in the horizontal operating position, to be precise by up to 1500 K.

Figure 2:
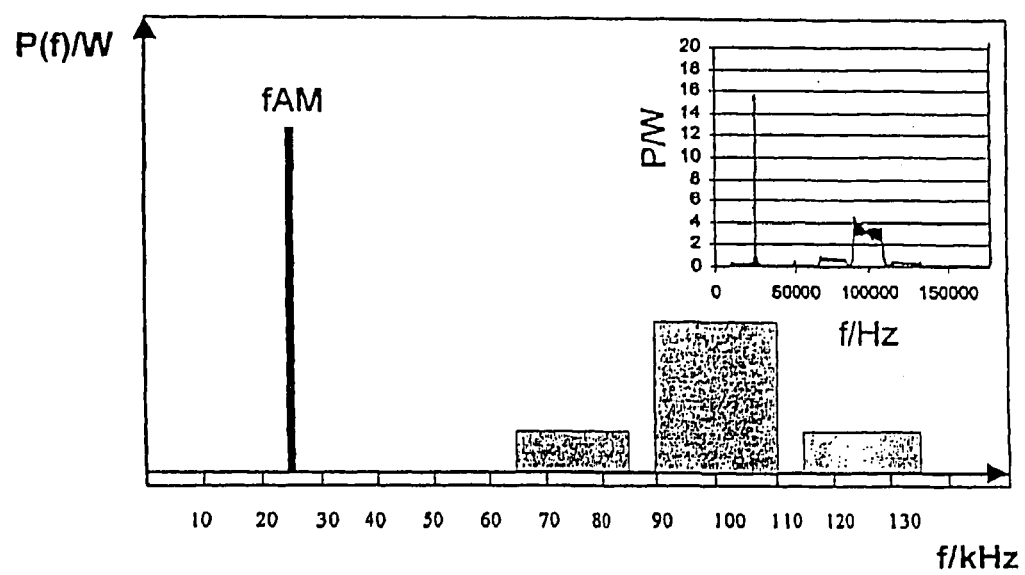
FIG. 2 shows a schematic power spectrum of a high-pressure lamp modulated with AM and FM for stabilization by means of acoustically stimulated longitudinal resonance.

The application of amplitude modulation at a fixed frequency fAM of about 25 kHz with an AM level of 10–30% results, as is shown in the schematic diagram in FIG. 2 (the small figure shows the actual measurement), in an electrical power spectrum in the lamp for a sweep rate of 130 per second, that is to say over the time interval of 7.7 ms, in the range from 20 to 150 kHz. Higher orders are no longer considered here, since it is possible to suppress them. The proportion of the power in the region of the AM frequency (25 kHz) stimulates the second acoustic longitudinal resonance f002.

Figure 3A:
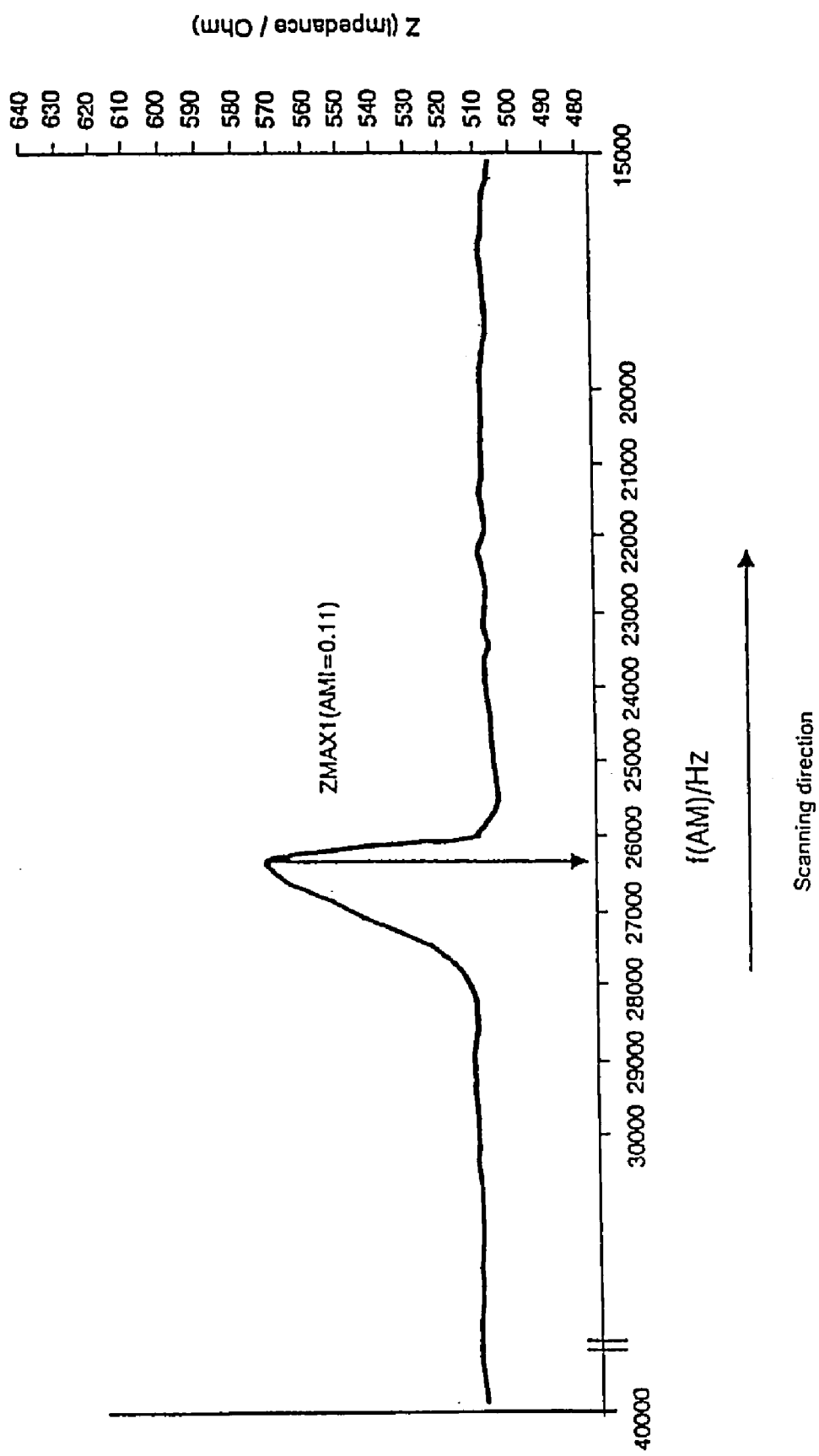
FIG. 3a shows two typical impedance profiles as a function of the frequency fAM for a different amplitude modulation index AMI for a 70 W high-pressure lamp.
Figure 7A:
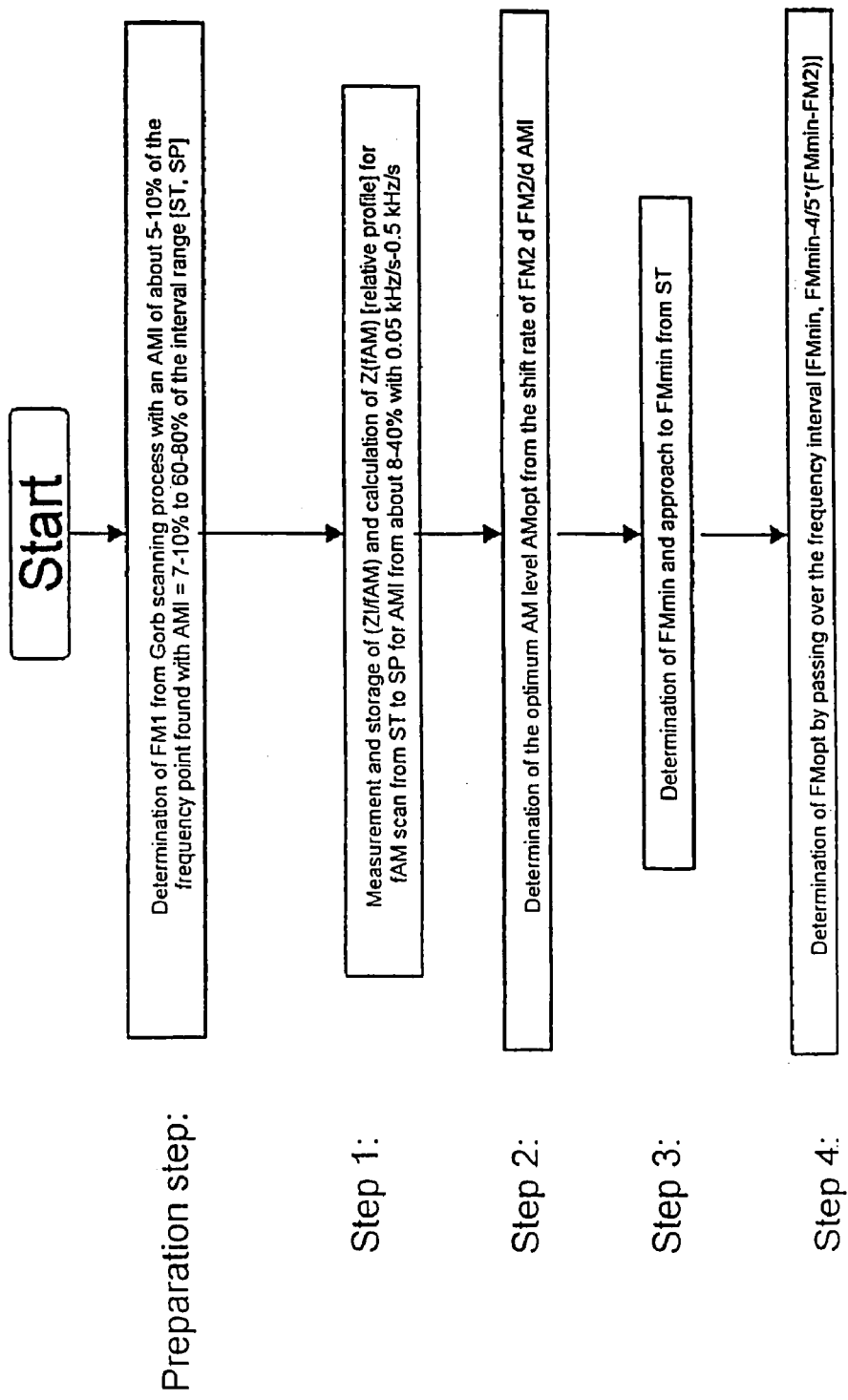
FIG. 7a shows the basic flowchart for finding the optimum frequency range.
Figure 7B:
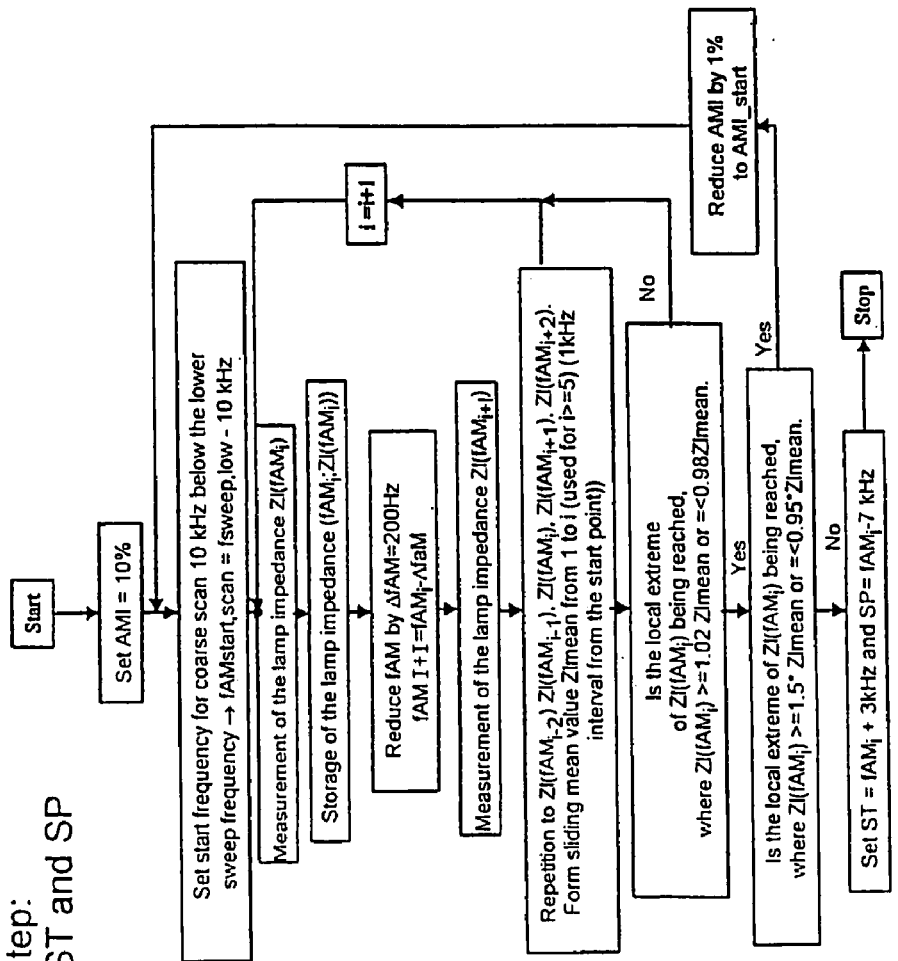
FIG. 7b shows the detailed flowchart for the preparation step.
Figure 7C:
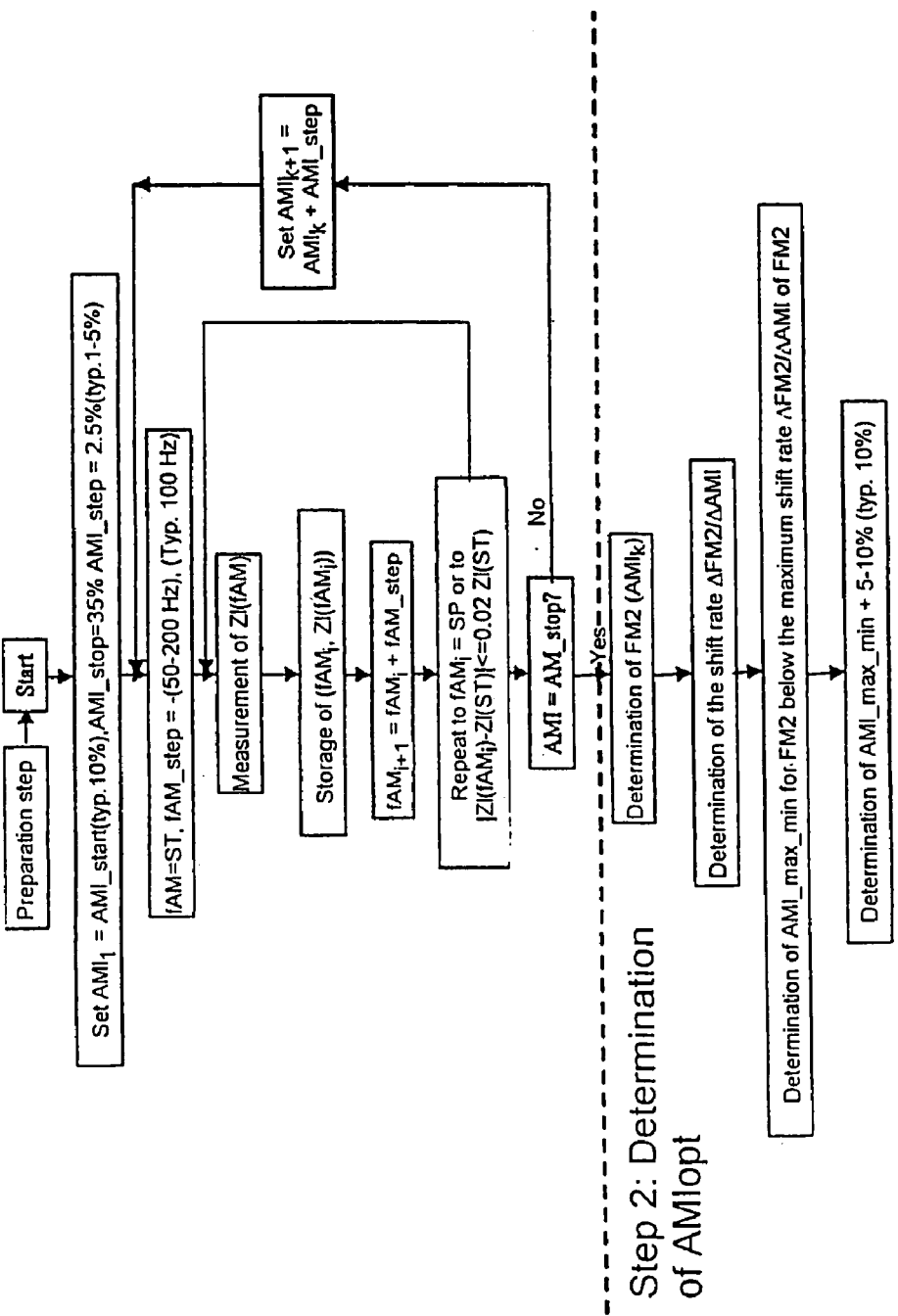
FIG. 7c shows the detailed flowchart for step 1 and step 2.
Figure 7D:
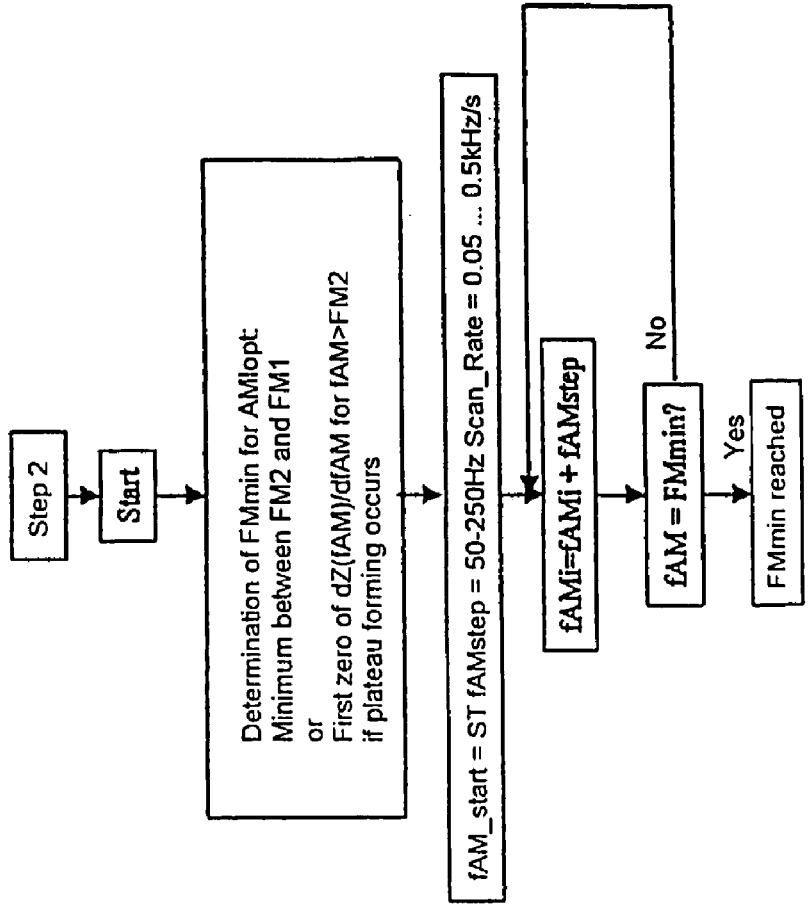
FIG. 7d shows the detailed flowchart for step 3.
Figure 7E:
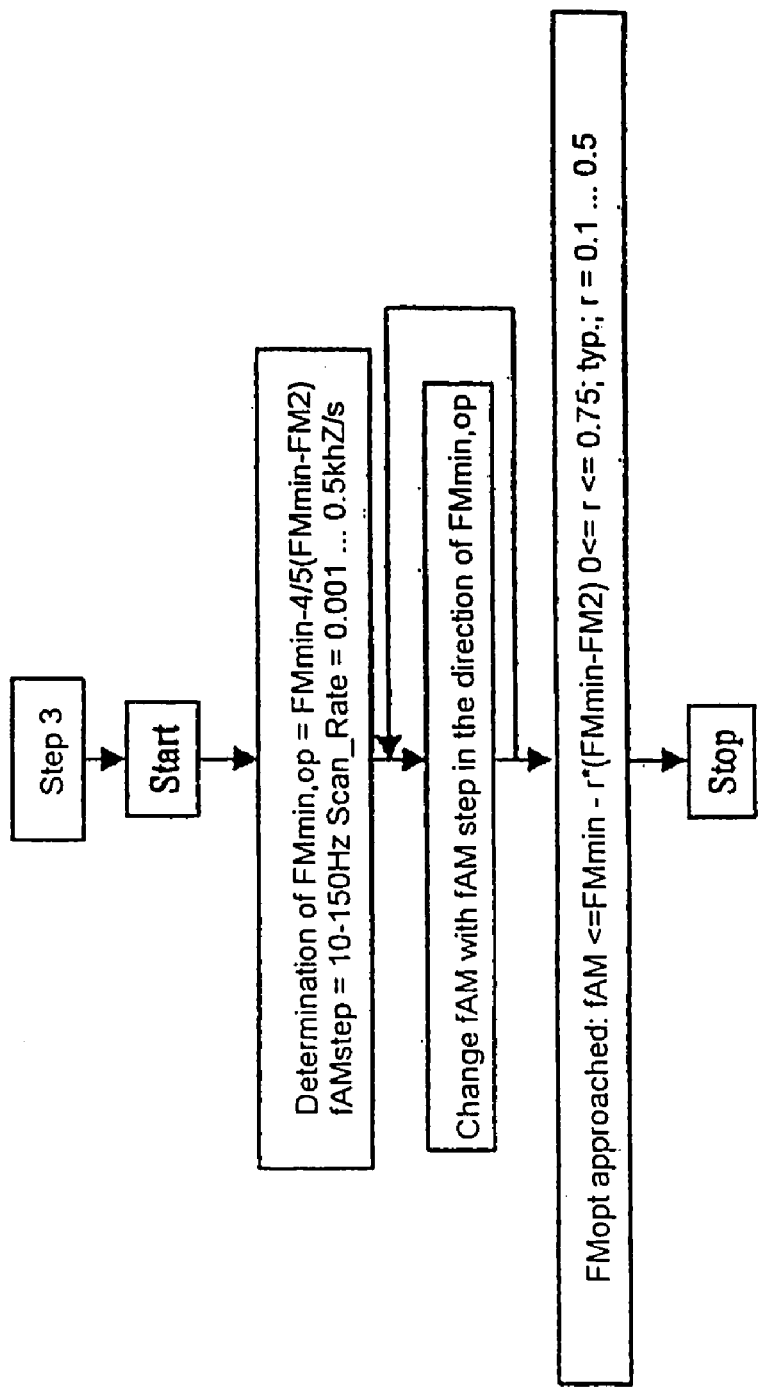
FIG. 7e shows the detailed flowchart for step 4.

In a preparation step, a wide frequency range for the amplitude modulation AM in the region of about fAM=40 kHz down to about 15 kHz is now scanned, first of all in the vertical operating position, with a low, constant AM level of about 5 to 15% in step widths of 150–250 Hz. This shows a noticeable increase in the lamp impedance (FIG. 3a) in the region around 27 kHz. This corresponds to a change in the mixing behavior resulting from resonance effects. A clear reduction in the segregation is evident as an abrupt change to the naked eye, with the region of the arc in the lower half of the discharge vessel, which is characterized by increased alkali and rare earth emission, being extended upwards into the upper area of the discharge vessel, roughly up to its center, and changing back again to the segregated step after moving through a frequency range of 1–2 kHz. Comparable changes in the lamp impedance can likewise be determined in the horizontal operating position, with the distribution of the metal halide vapor pressure likewise changing along the arc axis. In this context, reference should be made to the procedure flowchart, FIGS. 7a and 7b.

This region is assumed to be the extreme frequency range, which is now more greatly restricted in a further procedure with a sequence of AM frequency scans with an AM level being increased in steps.

Figure 3B:
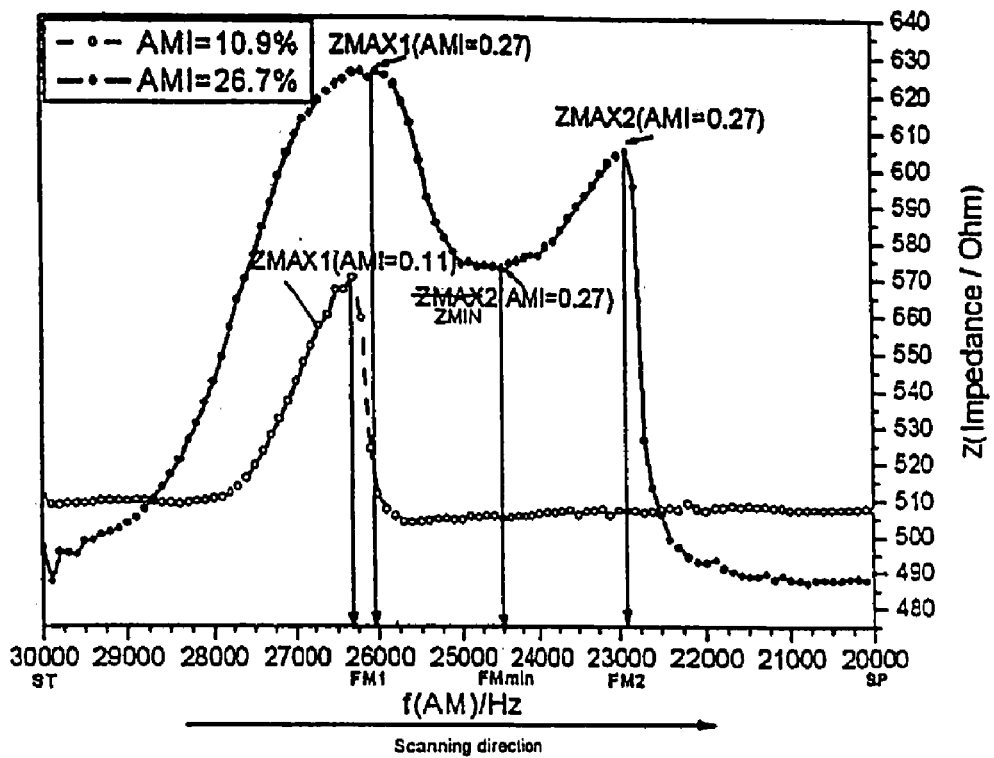
FIG. 3b shows a comparison of the typical impedance profile for a change in the amplitude modulation index AMI for a 70 W high-pressure lamp.

The frequency FM1 of 27 kHz, at which the single maximum ZMAX1 of the lamp impedance occurs with a low AM level in this exemplary embodiment, is now embedded, as is shown in FIG. 3b, into a narrower interval with a width, for example, of 10 kHz, which is defined by a start frequency ST (30 kHz) and an end frequency SP (20 kHz). In this case, the interval is chosen such that the position of the extreme (27 kHz) with a low AM level occurs at about 55–80% of the total interval of 10 kHz, that is to say the interval extends from ST=30 kHz to SP=20 kHz. The interval is thus chosen such that FM1=SP+m×(ST–SP) where m=0.55 to 0.8, and with m preferably being about 60 to 70%.

Another frequency scan from ST to SP is then carried out with the AM level increased and at a scan rate of about 0.12 kHz/s, remaining at each frequency point for about 0.5 s, and with the lamp impedance being determined at the end of the stabilization time at these points. FIG. 3b shows the principle of the AM level being increased suddenly in one go to 27% from the previous 11%. The clear increase in the AM level results in the surprising finding that a significantly pronounced secondary maximum of the lamp impedance (ZMAX2) occurs, and the associated frequency fAM is annotated FM2. A lamp impedance minimum occurs at the frequency FMmin between the two maxima ZMAX1 and ZMAX2.

However, in the operating method according to the invention, a large number of AM levels are set in steps (in this case from 10.9 to 36.6%). That is to say, with the AM level being increased in steps by 2 to 5% (in this case 2.4 to 2.7%), a repeated frequency scan (in this case carried out 11 times) from ST to SP is carried out at a scan rate of about 0.12 kHz/s, remaining at each frequency point for about 0.5 s, and with the lamp impedance being determined at the end of the stabilization time at these points. In this case, the lamp impedance values Z(fAM) found as shown in FIG. 3c are stored in the microcontroller for the electronic ballast.

Figure 3C:
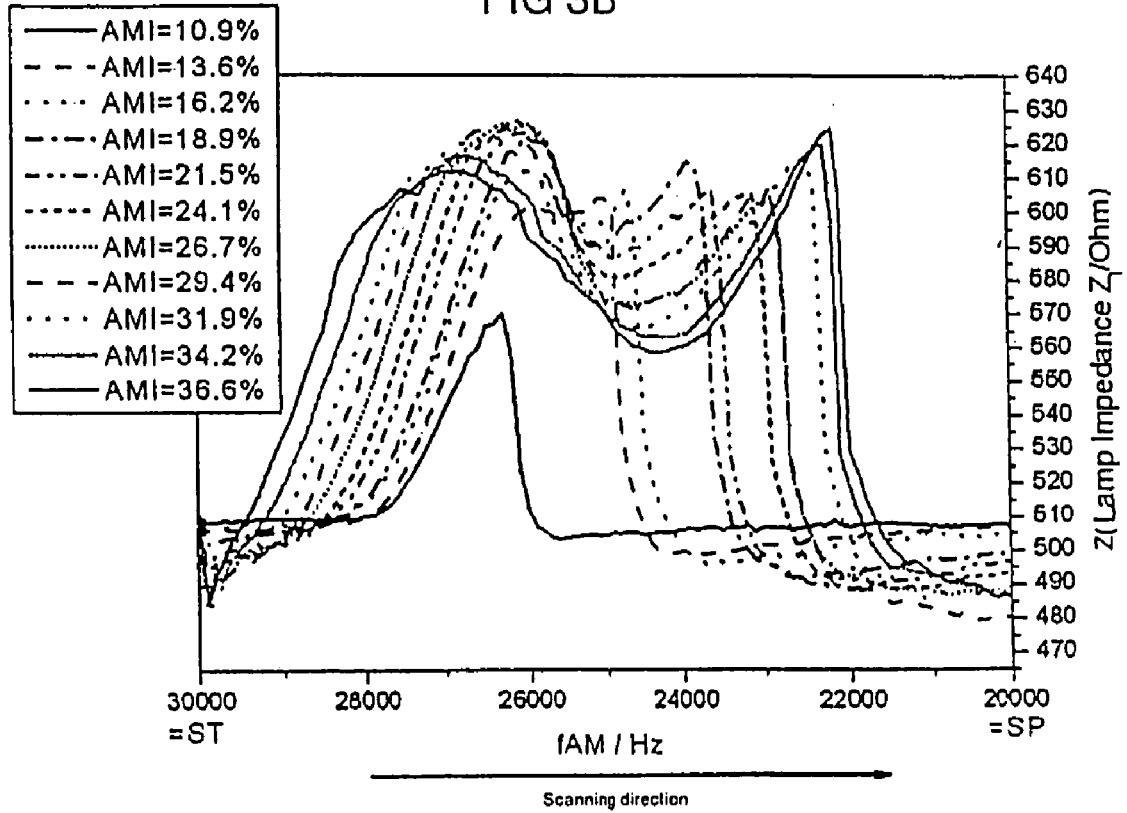
FIG. 3c shows a typical impedance profile for a multiple stage, step-by-step change in the amplitude modulation index AMI for a 70 W high-pressure lamp.
Figure 4:
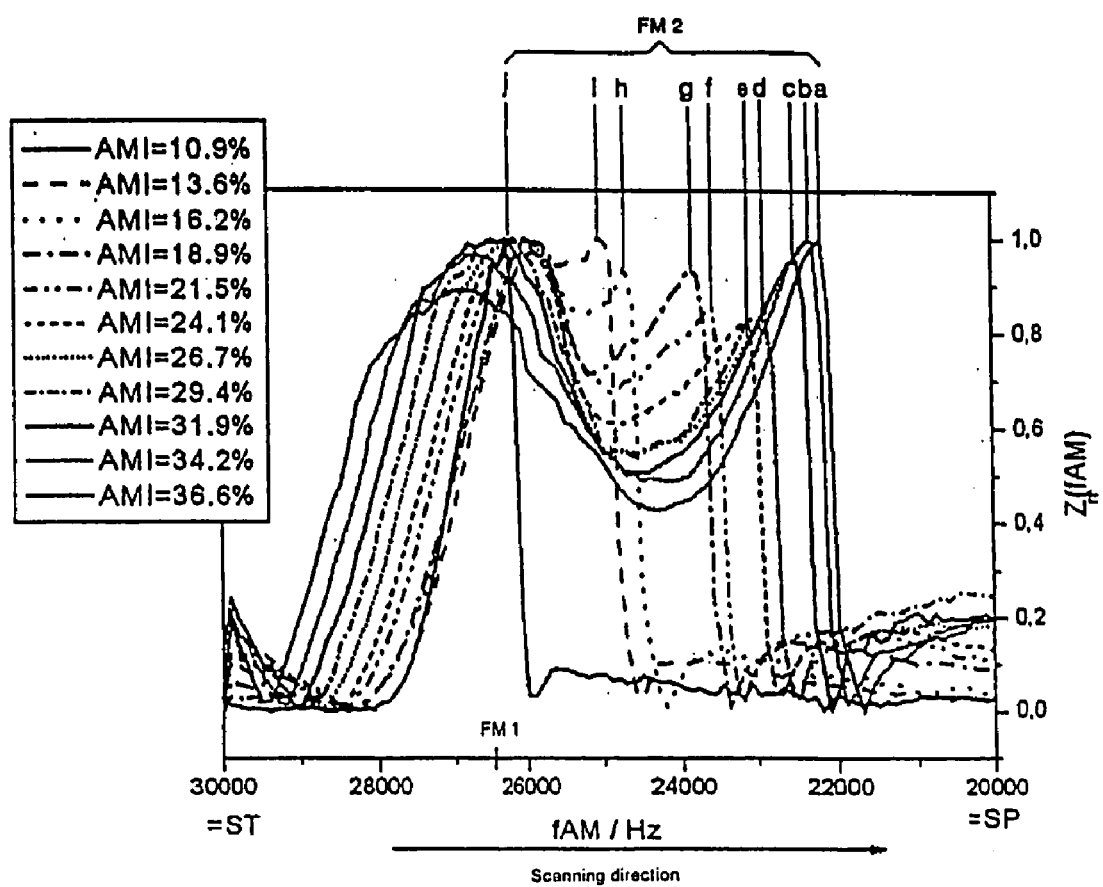
FIG. 4 shows the impedance profile from FIG. 3b, normalized with respect to the impedance maximum and related to a mean value of the start and stop frequencies.

As is shown in FIG. 4, the family of characteristics shown in FIG. 3c can also advantageously be illustrated in a normalized form as Zn(fAM) in order to assist clarity, for example with respect to the impedance values at the start point ST and end point SP of the scan range, and in which case a mean value of the frequencies ST and SP can also be used for illustrative purposes, annotated=ST and =SP in FIG. 4.

The frequency points FM2(AMI) are extracted from these profiles shown in FIG. 3c or 4. The associated maxima FM2 are respectively identified by a letter from a to j in FIG. 4. An abrupt change in the impedance occurs in each case after passing below these secondary maxima.

Figure 5:
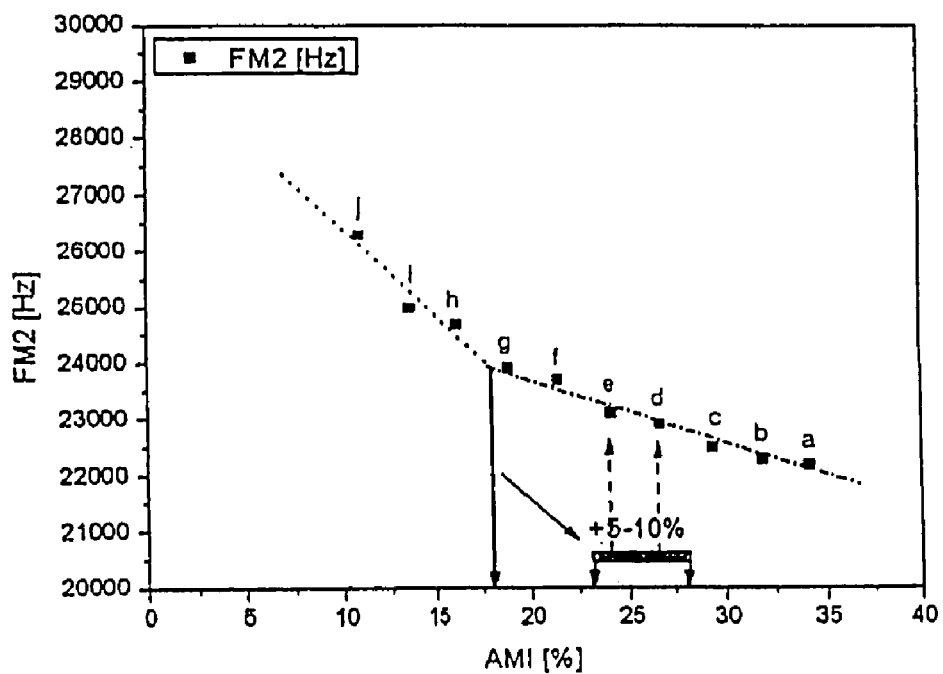
FIG. 5 shows how the optimum amplitude modulation index is determined from the FM2 shift rate as a function of AMI.

The frequencies FM2 of these maxima are now preferably also stored directly in the electronic ballast as an algorithm, against which the respectively associated AM level AMI is plotted. This relationship is illustrated in FIG. 5. That range of the AM level from which increased thorough mixing of the arc plasma occurs can be determined by differentiation in sections, this being the point of inflection g in the example shown in FIG. 5. The second maximum of the lamp impedance is formed particularly clearly from this, with the associated frequency FM2 being separated from FM1, the frequency of the first maximum, by a minimum FMmin, see also FIG. 3b. An optimum AM level AMIopt is extracted from the result shown in FIG. 5 by now applying a value of at least 5% to the AM level (in this case about 18%) determined at the point of inflection (in this case: g).

Figure 6:
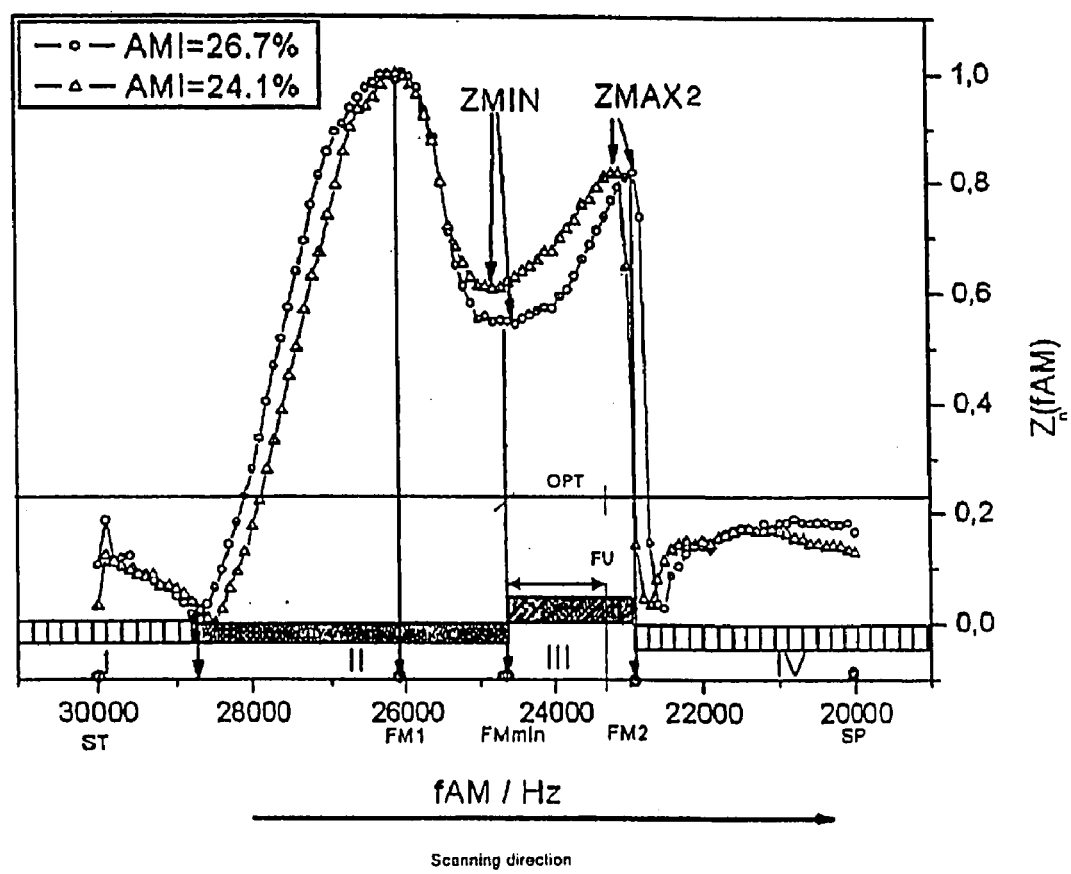
FIG. 6 shows a breakdown of the impedance profile as a function of fAM in areas with a different thorough mixing behavior with an optimum AM level having been chosen, and with a preferred frequency range having been chosen.

FIG. 6 shows the relative profile of the normalized impedance Zn for two AMI values in the vicinity of the optimum AM level for stable long-term operation. At the same time, the impedance profile is shown broken down into four areas I to IV, which correspond to different mixing states of the metal halide plasma in the discharge arc, as a function of the impedance profile.

The acoustic coupling to the arc plasma is minimal in the areas I and IV (shaded strip), since the stimulation frequencies are too far away from the effective resonant frequencies. This leads only to a minor change in the lamp impedance as a function of the frequency fAM. There is admittedly more plasma mixing in the area II (strip on a gray background). A centrally deposited ring composed of filling material has already been formed in the area II in the horizontal operating position. The increased mixing in the vertical operating position is, however, not yet reliably sufficient to achieve a considerable decrease in the segregation in the area of the upper electrode. However, because it is simple to find, this was actually the area which was previously used deliberately in the prior art.

The preferred setting range is, according to the invention, in the area III (shaded and emphasized strip). This is located between the frequencies FM2 and FMmin for an impedance between the minimum and the secondary maximum. Considerably better plasma mixing is achieved, slightly below the AM frequency of the minimum, FMmin, than in the area II. It is only here that a further improvement in the color rendition and a further increase in the light yield occurs, as well as a good match between the lighting values in the vertical and horizontal operating positions.

A frequency fAM can now be set for further operation, remaining for a considerably longer time at each frequency point.

In a further exemplary embodiment, it is also possible not to permanently set any specific fixed frequency point fopt in the area III, but to use different frequency points over the course of operation of the lamp systematically and periodically in the interval OPT from FMmin to about FU=FM2+ 1/5×(FMmin−FM2). The variation of the frequency point in the abovementioned range may lead to a slight shift in the color temperature (typically a few 10 K) with approximately the same light yield. The application area thus covers approximately up to 4/5 of the area III.

Good lamp stability and approximately identical color temperatures in any desired operating position are obtained with a simpler embodiment by setting a fixed frequency point fopt within the interval OPT in the area III, preferably in a band which is covered by the frequency points fopt=FM2+R×(FMmin−FM2) where $0.3 \leq R \leq 0.7$.

FIG. 7 illustrates, schematically, the procedure for the operating method. All 5 basic steps are combined in FIG. 7a. A preparation step is first of all carried out, after starting of the lamp and waiting for a stabilization time (typically one minute).

In the preparation step, a first resonance of the impedance value Z, that is to say ZEXT1, is determined theoretically or experimentally for a very low AM level of 5 to 15% (typically 10%), by scanning a large frequency interval which undoubtedly includes the extreme. The associated frequency point FM1 is used to define a measurement interval MI, which has a width of 8 to 25 kHz with the cut-off points ST (upper cut-off frequency) and SM (lower cut-off frequency), and in which FM1 is arranged such that FM1 is located at about 55 to 80%, preferably 60 to 70% of the interval between SM and ST, in which case FM1 must always be closer to ST.

The measurement interval is always scanned from top to bottom, that is to say from ST to SP.

Step 1 is the determination of a family of characteristics, and is obtained by scanning different AM levels, which are changed in steps, in a maximum range AMI=5 to 45%, in particular 10 to 40%, with the measurement interval MI in each case being scanned. In general, it is sufficient to vary the AM level in about 6 to 15 steps. The maximum range AMI would, at its lower end, cover an AM level in which, in practice, only a single extreme (generally a maximum) of the lamp impedance can be seen, covering, at its upper end, an AM level at which at least one second maximum has clearly appeared.

Step 2 comprises the determination, derived from this, of the optimum AM level AMI=AMopt by comparison of the change in the lamp impedance as a function of the frequency for the various AM levels. AMopt is defined by determination of the maximum change in the lamp impedance. The associated value of AMI is AMmd. This is once again increased by a value W of 3 to 10%, in order to obtain AMopt, that is to say AMopt=AMmd+W.

Step 3 comprises searching for the frequency FMmin (AMopt) which is associated with AMopt. This can be determined from the family of characteristics and, in the case of the lamp, is approached from the start point ST.

Finally, step 4 comprises the final definition of the operating frequency FMopt by scanning the frequency interval OPT between FMmin and a value which is 20% of FM2 away in the interval between FMmin and FM2, and by analyzing the corresponding operating data.

The five steps are illustrated in detail in FIGS. 7b to 7e. The electronic ballast can then be operated continuously at AMopt and FMopt. In addition, a switching-off mechanism can be provided, for example an end-of-life circuit or a check which continuously monitors that the operating state is correct. If required, readjustment can be carried out once again during continuous operation in the event of a discrepancy, for example in steps 3 and 4.

Individual steps can also be used specifically for controllable adjustment of lamp parameters such as the color temperature.

Figure 8:
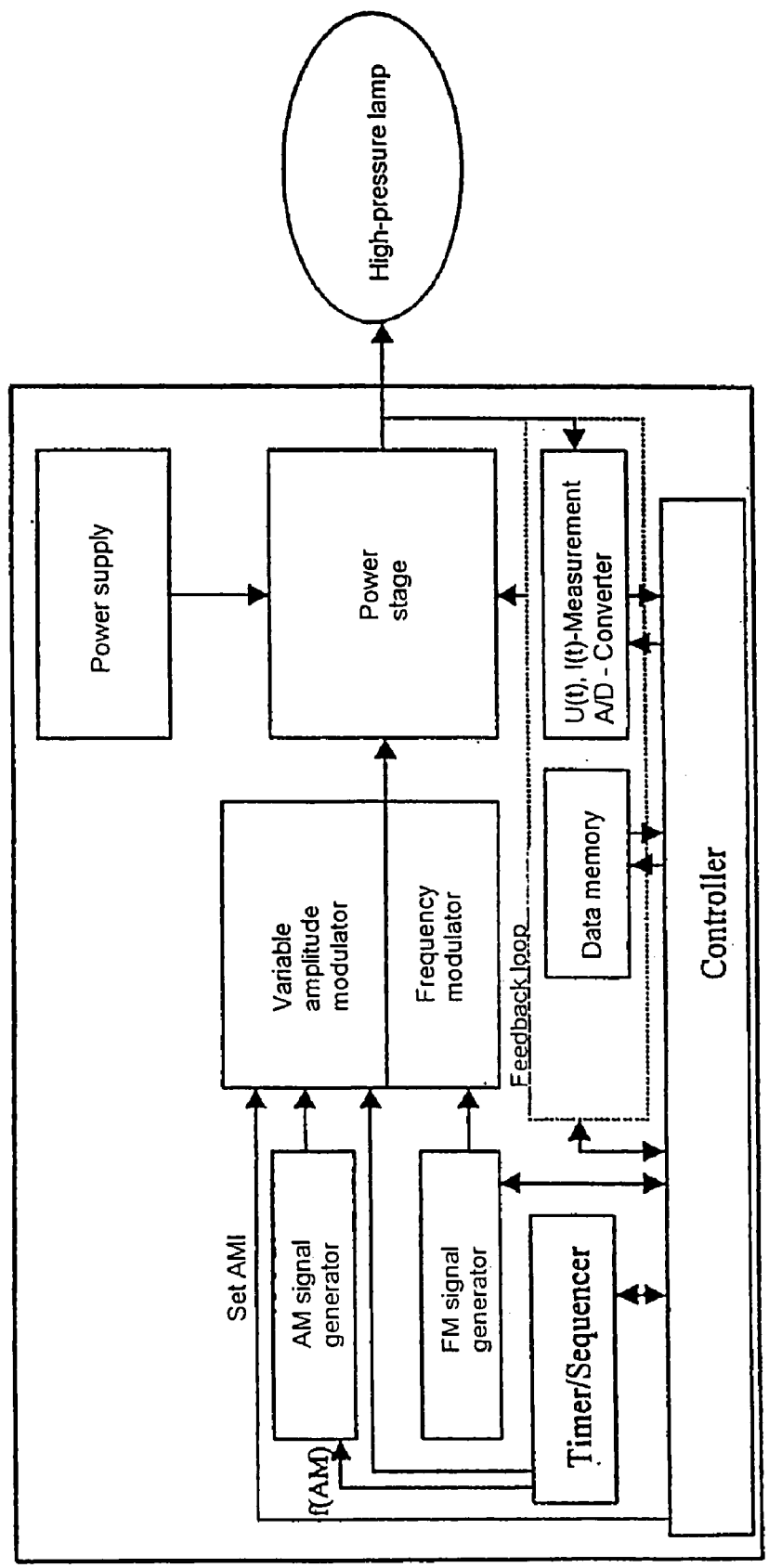
FIG. 8 shows the schematic design of an electronic ballast.

FIG. 8 shows an outline circuit diagram of an associated electronic ballast, whose essential components are as follows:

Time/sequencer: this monitors the schedule for controlling the time duration of the warming-up phase and the use of the application phase after starting and the striking of the arc in the high-pressure lamp. The sweep rate for lamp arc stabilization is also controlled here.

The control process also covers the scan rate as well as the dwell duration at the respective frequency point when carrying out frequency scans, as well as the definition of pause times between successive procedure steps.

Power stage (power up stage): full bridge or half bridge with current-limiting elements and a typical frequency response. This is coupled to the power supply via a supply rail (450 V DC).

Feed-back loop: Identification that the lamp is operating, possibly feedback of lamp parameters such as the lamp current and lamp voltage in order to adjust the control parameters and to define the warming-up and application phase, and repetition of application phases with different adjustment parameters.

A circuit element is implemented here for sufficiently accurate measurement of the current and voltage at the electronic ballast output (lamp). The measured values for processing in the controller are processed further via this, by means of an A/D converter. The data gathered is written to a data memory for further evaluation procedures.

Lamp: High-pressure discharge lamp (HID lamp).

FM modulator: High-power frequency modulator.

AM modulator: Analogue variable high-power modulator with the capability to check both the frequency fAM and the AM level AMI.

AM signal generator: Digital or voltage controlled oscillator.

FM signal generator: Digital or voltage controlled oscillator.

Power supply: Rail voltage generator.

Controller: Central monitoring of all units.

What is claimed is:

1. An operating method for acoustic resonant operation of a metal halide lamp using a radio frequency carrier frequency which is frequency-modulated (FM) by means of a sweep signal and which is amplitude-modulated (AM) at the same time, with a fundamental frequency first of all being set for the AM signal, which is derived from an $i^{th}$, preferably the second, longitudinal resonance, wherein at least the following steps are carried out successively after starting of the lamp and after waiting for a stabilization time:
    a) Preparation step: during this step, a first resonance of the impedance value (Z) of the lamp, that is to say (ZEXT 1), is first of all determined theoretically or experimentally during this step with a very low AM level (AMI) of 5 to 15% in such a way that a large frequency interval is covered for (f(AM)) which will certainly include an extreme; a frequency point (FM1) associated with (ZEXT 1) is used to define a measurement interval (MI) which has a width of 8 to 25 kHz with cut-off points (ST) (upper cut-off frequency) and (SM) (lower cut-off frequency), and in which (FM1) is arranged such that (FM1) is located at approximately 55 to 80%, preferably 60 to 70%, of the interval between (SM) and (ST), where (FM1) must always be closer to (ST);
    b) Step 1: the measurement interval (MI) is passed through during this step; a family of characteristics is thus determined which is obtained by passing through different AM levels, which are changed in steps, in a maximum range (AMI)=5 to 45%, in particular 10 to 40%, with the measurement interval (MI) in each case always being passed through from top to bottom, that is to say from (SM) to (ST);
    c) Step 2: determination derived from the family of characteristics, of an optimum AM level (AMI)= (AMopt) by comparison of a change in the lamp impedance as a function of the frequency for various AM levels; determination of a maximum of a change in the lamp impedance for an associated value of (AMI) equal to (AMmd); definition of (AMopt) by the rule (AMopt)=(AMmd)+(W) where (W)=3 to 10%;
    d) Step 3: search for a frequency (FMmin) associated with (AMopt);
    e) Step 4: definition of the operating frequency (FMopt) by passing through a frequency interval (OPT) between (FMmin) and a value which is 20% of (FM2) away in the interval between (FMmin) and a lower frequency end point (FM2).

2. The operating method as claimed in claim 1, wherein a frequency of the sweep signal (sweep frequency) is derived from a first azimuth and radial modes.

3. The operating method as claimed in claim 2, wherein the sweep frequency is kept constant during operation, and in that it is selected from a range between the first azimuth and radial mode.

4. The operating method as claimed in claim 1, wherein the stabilization time lasts for about 30 to 80 seconds.

5. The operating method as claimed in claim 1, wherein the preparation step is carried out at least once.

6. The operating method as claimed in claim 1, wherein step 3 is carried out whenever the lamp is started.

7. The operating method as claimed in claim 1, wherein a mean constant rate by which the frequency of the amplitude-modulation frequency is varied when passing through the AM frequency is between 0.05 kHz per second and 1 kHz per second.

8. The operating method as claimed in claim 1, wherein at least 6 and at most 15 profiles of the lamp impedance are passed through in the step 1.

9. The operating method as claimed in claim 1, wherein the operating frequency (FMopt) is selected to be constant whenever the lamp is started.

10. The operating method as claimed in claim 1, wherein the operating frequency (FMopt) is obtained from the interval (OPT) by passing through a range of individual frequencies.

11. The operating method as claimed in claim 1, wherein the AM level is set in a range from 10 to 37%.

* * * * *